US006735670B1

United States Patent
Bronstein et al.

(10) Patent No.: US 6,735,670 B1
(45) Date of Patent: May 11, 2004

(54) FORWARDING TABLE INCORPORATING HASH TABLE AND CONTENT ADDRESSABLE MEMORY

(75) Inventors: Zvika Bronstein, Ramat Efal (IL); Opher Yaron, Tel Aviv (IL); Golan Schzukin, Tel Aviv (IL); Ilan Shimony, Haifa (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/570,204

(22) Filed: May 12, 2000

(51) Int. Cl.[7] .............................................. G06F 12/00
(52) U.S. Cl. ......................... 711/108; 711/216; 365/49
(58) Field of Search ........................ 711/108, 202–203, 711/216, 220; 365/49; 370/389, 392

(56) References Cited

U.S. PATENT DOCUMENTS

| 5,414,704 A | * | 5/1995 | Spinney ..................... 370/389 |
| 5,583,867 A | * | 12/1996 | Poole ........................ 370/257 |
| 5,920,900 A | * | 7/1999 | Poole et al. ................ 711/216 |
| 6,570,877 B1 | * | 5/2003 | Kloth et al. ................ 370/392 |
| 6,665,297 B1 | * | 12/2003 | Hariguchi et al. .......... 370/392 |

OTHER PUBLICATIONS

Hash Table Tutorial, IBM Corporation 1998; URL:http://www.slac.standord.edu.comp/ . . . /364/doc/ioc/concepts/c3chasht.html.

Hash Table Dictionary, May 1999; URL:http://www.ccs.ne-u.edu/home/sbratus/com1101/hash–dict.html.

Hash Tables—Data Structures and Algorithms, John Morris, 1998; URL:http://swww.ee.uwa.edu.au/~plsd210/ds/hash_tables.html.

\* cited by examiner

*Primary Examiner*—Nasser Moazzami
(74) *Attorney, Agent, or Firm*—Howard Zaretsky; Zaretsky & Associates PC

(57) ABSTRACT

A forwarding table comprising a combination of a hash table and a content addressable memory (CAM). The forwarding table combines a one way hash table and a small CAM to perform the forwarding information retrieval function. The CAM is used when an address cannot be found in the hash table. When MAC addresses are being added to the forwarding table, they are first tried in the hash table. The address is applied to the hash function and a resulting index input to the hash table. If a hit occurs, it indicates that an entry at that index already exists and a location in the CAM is then allocated for that address. As long as the CAM does not become full, a 100% hit rate is guaranteed. During retrieval, the hash table or the CAM forms the forwarding information output to the next processing stage. If an entry is not found in the hash table, it will typically be found in the CAM. If no entry is found in either, the received frame is flooded to all the ports of the network device.

27 Claims, 5 Drawing Sheets

FORWARDING TABLE INCORPORATING HASH TABLE AND CONTENT ADDRESSABLE MEMORY

FIELD OF THE INVENTION

The present invention relates generally to data communications networks and more particularly relates to a forwarding table constructed using a combination of HASH table and contents addressable memory (CAM).

BACKGROUND OF THE INVENTION

Currently, the number of data networks and the volume of traffic these networks carry are increasing at an ever increasing rate. The network devices that make up these networks generally consist of specialized hardware designed to move data at very high speeds. Typical networks, such as Ethernet based networks, are comprised mainly of end stations, Ethernet hubs, switches, routers, bridges and gateways. ATM networks are constructed with similar network devices adapted to carry ATM traffic, e.g., ATM capable end stations, edge devices and ATM switches.

With the ever increasing user demand for faster and faster data communications, network devices must perform at higher and higher speeds. A primary function of a typical network devices is to receive frames (packets, cells, etc.) at one or more ingress ports, and forward the frame to the appropriate egress port. Accomplishing this requires that the network device make a forwarding decision about the received frame. This requires processing resources and typically utilizes a memory lookup operation in making the forwarding decision.

For example, consider a network device with 64 output ports. For each frame received, a forwarding decision must be made to determine which of the output ports to forward the frame to or whether to drop the frame altogether. The decision to forward to one or more ports is indicated in a 64 bit output port vector whereby a bit is set corresponding to each port the frame is to be output to. Assuming that the forwarding decision is made after receipt of the header, than the 64 bit output port vector is stored in a memory queue until the entire frame has been received. Once received, the output port vector is retrieved from memory and the frame is directed to the output ports indicated in the corresponding output port vector.

The memory used to store the output port vector, i.e. the forwarding information, typically utilizes some form of hash table. Hashing techniques are widely used in computer hardware and software systems, such as operating systems, compilers, etc., to store large numbers of elements. Hashing involves calculating an index from a key and using the index to look for matches in a hash table. The function that calculates the index is known as a hash function. The use of hashing permits a plurality of elements to be stored in very large spaces, thus they impose little restriction on the size of the collection of elements stored.

The hash table is well suited for fast storage and retrieval of information elements. The efficiency of a hash table implementation is largely dependent on the hash function used. The keys used by a hash table may be simple or complex, which in the latter case may be made up of several attributes of an element. Alternatively, the complete element may be used as the input to the hash function.

A block diagram illustrating an example hash table implementation some of the entries of which have one or more collisions associated therewith is shown in FIG. 1. The hash table, generally referenced 10, comprises a table 19 having a plurality of entries 12. In this example, the table 19 comprises 10 entries. The input (known as the key) is applied to the hash function 18. The function takes the key and 'hashes' it wherein it returns an index (possibly a large integer) obtained by manipulating the key. The index generated by the hash function is then applied to the hash table 19.

With a good hash function, all the bits in the key affect the value of the index generated. In addition, the dependence of the index on the value of the key is preferably non-obvious.

The principle of a hash table is that a possibly infinite set of elements is partitioned into a finite number of hash values. The hash function is performed using the key as input to yield a resulting hash value (i.e. index). A hash collision occurs, however, if for two different keys the hash function returns the same hash value. In such cases, a collision list is generated whereby all the keys that return the same hash value are linked.

For example, with reference to FIG. 1, the hash function 18 calculates the index from the key by (1) transforming the key into an integer according to its position in the alphabet, (2) the resulting integers are added together and (3) the result is divided by the size of the hash table (i.e. 10) and the remainder is the hash result or index.

Thus, the key 'cdf' is hashed to the value 3. The key 'no' is hashed to the value 9. A first collision occurs when hashing the key 'efh'. As a result, both keys are placed in a collision linked list that is associated with table entry 9. A second collision occurs on the key 'ccc' and as a result, this key is added to the collision linked list associated with hash table entry 9. Note that each entry and associated linked list is commonly called a bucket. Upon retrieval, the linked list associated with a hash result is searched element by element for a match with the key. If the indexes obtained by hashing are uniformingly distributed across the array of buckets, then the buckets are not likely to be long.

Thus, in the ideal case, a hash function returns a different hash value for each unique key. If there are collisions, it is preferable that the collision linked list remains small in order to maintain fast access time. This means that hash values should be evenly distributed across all the hash table entries. In addition, the hash function preferably always returns the same hash value for a given key.

Note that in many applications, a hash table is better at retrieving information that an array or a linked list since the correct bucket is away determined very quickly using hashing. Then, if there were one or more collisions, only the few keys that collided at the index of the bucket must be searched.

Thus, choosing a good peforming hashing function h(k) is the tricky part of implementing a hash table based search and retrieval system. The function h should ideally distribute the input elements as uniformly as possible over the buckets (or slots) of the hash table. The major criterion is that the hash function should generate a minimum number of collisions.

If the probability that a key k occurs in the set of input value is P(k), and there are m slots in the hash table, then a uniform hashing function h(k) satisfies:

$$\sum_{k|h(k)=0} P(k) = \qquad (1)$$

-continued $$\sum_{k|h(k)=1} P(k) = \ldots = \sum_{k|h(k)=m-2} P(k) = \sum_{k|h(k)=m-1} P(k) = \frac{1}{m}$$

Most of the time it is not possible to ensure this. Thus, a uniform hashing function is difficult to achieve in practice.

A hash table is realized using a large enough memory to store the hashed index values in a one way organization. The hashing function hashes the key to a smaller index. In a network device application, the key comprises a MAC address, for example. The index is used to access a linear table called the hash table. The MAC address is stored at a location corresponding to the index along with the forwarding information. In the event of a collision, a sequential search is performed of the collision linked list associated with that location. A hit occurs when the index matches the stored data.

The advantage of using a hash table is its relatively low cost in terms of size required to store a given number of entries. A disadvantage of a hash table with a collision linked list is the multiple cycles required for finding a hit. Limiting the number of addresses per hash entry is likely to result in one or more addresses not being able to be stored, resulting in a less than 100% hit ratio.

SUMMARY OF THE INVENTION

The present invention solves the problems associated with the prior art by providing a forwarding table comprising a combination of a hash table and a content addressable memory (CAM). The advantages of both a hash table and a CAM are combined in the forwarding table of the present invention. The forwarding table combines a one way hash table and a small CAM to perform the forwarding information retrieval function. The data stored in the hash table is limited to one MAC address per entry thus eliminating the additional time required to search a collision linked list in the event multiple keys hash to the same entry in the hash table.

When MAC addresses are being added to the forwarding table, they are first tried in the hash table. The key (i.e. MAC address) is applied to the hash function and a resulting index input to the hash table. If a hit occurs, it indicates that an entry at that index already exists and a location in the CAM is then allocated for that address. As long as the CAM does not become full, a 100% hit rate is guaranteed.

The hash function utilizes one or more hashing polynomials to perform polynomial division of the key. The results of the polynomial division are used to generate an output index. The index is used to retrieve a corresponding entry in the hash table. In parallel, the key is also applied to the CAM.

During retrieval of forwarding information from the forwarding table, one of the two outputs from the hash table and the CAM forms the forwarding information that is output to the next processing stage. A forward pointer select circuit generates the select signal to a multiplexer whose inputs comprise the outputs of the hash table and CAM. Either the hash table or the CAM generates a hit but not both. Thus, if the hash table generates a hit, the multiplexer selects the forwarding information generated by the hash table as the output forwarding information. On the other hand, if the CAM generates a hit, the multiplexer selects the forwarding information generated by the CAM as the output forwarding information.

There is thus provided in accordance with the present invention a table for storing and retrieving a plurality of elements comprising a hash function operative to generate an index in accordance with a key input thereto, a hash table having a plurality of entries and adapted to store the elements in accordance with their corresponding indexes, a content addressable memory (CAM) operative to store the elements in accordance with their content, storing means for adding an element to the table, the storing means operative to apply the element as an input key to the hash function and to generate an index in response thereto, apply the index to the hash table, and in the event of a miss, write the element to the hash table, and in the event of a hit, allocate a location in the CAM and store the element therein and retrieving means for retrieving an element from the table in accordance with an input key, the retrieving means operative to apply the key to the hash function and generate an index in response thereto, apply the index to the hash table and use the element generated in the event of a hit and apply the key to the CAM and use the element generated in the event of a hit.

There is also provided in accordance with the present invention a forwarding table for storing and retrieving forwarding information based on Media Access Code (MAC) addresses comprising a hash function operative to generate an index in accordance with a MAC address key input thereto, a hash table for storing forwarding information in accordance with corresponding MAC addresses, a content addressable memory (CAM) operative to store forwarding information in accordance with MAC addresses, storing means for adding a MAC address entry to the forwarding table, the storing means operative to apply the MAC address as an input key to the hash function and to generate an index in response thereto, apply the index to the hash table and in the event of a miss, write forwarding information corresponding to the MAC address to the hash table, and in the event of a hit, allocate a location in the CAM and store the forwarding information corresponding to the MAC address therein and retrieving means for retrieving forwarding information from the forwarding table in accordance with a MAC address key, the retrieving means operative to apply the key to the hash function and generate an index in response thereto, apply the index to the hash table and use the forwarding information generated in the event of a hit and apply the key to the CAM and use the forwarding information generated in the event of a hit.

There is further provided in accordance with the present invention a method of storing and retrieving forwarding information based on Media Access Code (MAC) addresses in a forwarding table, the method comprising the steps of generating an index using a hashing function and in accordance with a MAC address key input thereto, storing forwarding information in accordance with corresponding MAC addresses in a hash table, storing forwarding information in accordance with MAC addresses in a content addressable memory (CAM), adding a MAC address entry to the forwarding table by applying the MAC address as an input key to the hash function and generating an index in response thereto, applying the index to the hash table, and in the event of a miss, writing forwarding information corresponding to the MAC address to the hash table, and in the event of a hit, allocating a location in the CAM and storing the forwarding information corresponding to the MAC address therein and retrieving forwarding information from the forwarding table in accordance with a MAC address key by applying the key to the hash function and generating an index in response thereto, applying the index to the hash table and using the forwarding information generated in the event of a hit and applying the key to the CAM and using the forwarding information generated in the event of a hit.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| ATM | Asynchronous Transfer Mode |
| BUS | Broadcast and Unknown Server |
| CAM | Content Addressable Memory |
| DA | Destination Address |
| ELAN | Emulation LAN |
| IP | Internet Protocol |
| LAN | Local Area Network |
| LE | LAN Emulation |
| LEC | LAN Emulation Client |
| LECS | LAN Emulation Configuration Server |
| LES | LAN Emulation Server |
| MAC | Media Access Control |
| MPOA | Multiprotocol Over ATM |
| OC | Optical Carrier |
| PDU | Protocol Data Unit |
| SA | Source Address |
| SMS | Selective Multicast Server |
| VCI | Virtual Circuit Identifier |
| VLAN | Virtual Local Area Network |
| VPI | Virtual Path Identifier |

Description of the Invention

The present invention solves the problems associated with the prior art by providing a forwarding table comprising a combination of a hash table and a content addressable memory (CAM). The advantages of both a hash table and a CAM are combined in the forwarding table of the present invention. The forwarding table combines a one way hash table and a small CAM to perform the forwarding information retrieval function. The data stored in the hash table is limited to one MAC address per entry thus eliminating the additional time required to search a collision linked list in the event multiple keys hash to the same entry in the hash table.

For illustration purposes, the principles of the present invention are described in the context of an example network device comprising an ATM edge device incorporating a plurality of Ethernet ports (e.g., 64 ports) and ATM ports (e.g., 2 ports). Thus, the example device is simultaneously connected to an Ethernet network and an ATM network. Note, however, it is not intended that the invention be limited to the network device described herein. It is appreciated that one skilled in the networking arts may apply the present invention to other types of network devices as well without departing from the spirit and scope of the invention. Note that throughout this document, references are made to Ethernet frames and ATM cells which are example protocol data units (PDUs) associated with Ethernet networks and ATM network, respectively. It is appreciated that the invention may be adapted for use in different types of networks that transmit other types of PDUs, e.g., packets.

Figure 1:
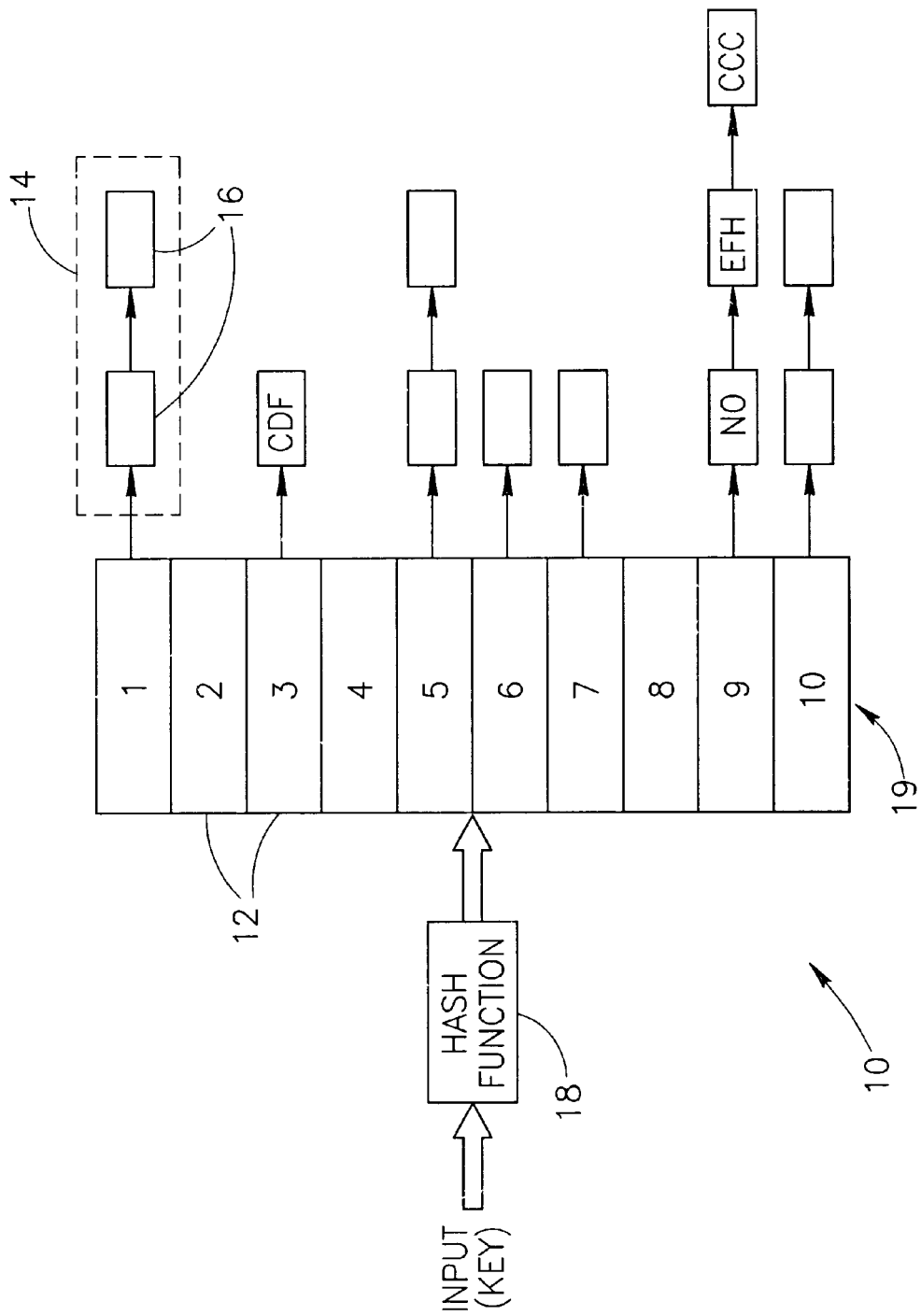
FIG. 1 is a block diagram illustrating an example hash table implementation some of the entries of which have one or more collisions associated therewith.
Figure 2:
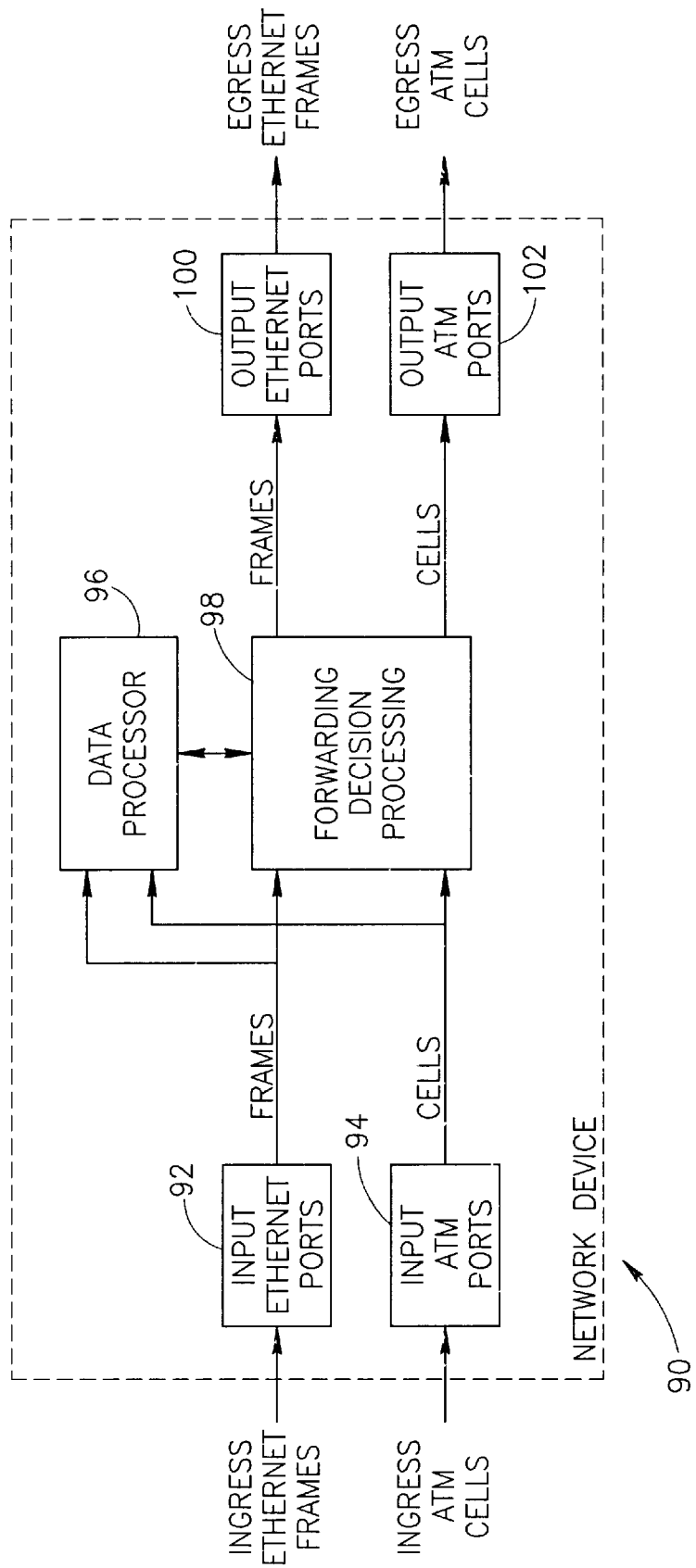
FIG. 2 is a block diagram illustrating an example network device incorporating one or more Ethernet and ATM ports.

A block diagram illustrating an example network device incorporating one or more Ethernet and ATM ports is shown in FIG. 2. The example network device, generally referenced 90, comprises an edge device for use in an ATM network. The device 90 comprises a plurality of Ethernet ports and ATM ports. In addition, the device provides standard LAN Emulation services, such as LEC, BUS, LECS, LES, SMS, etc., as defined by ATM Forum LAN Emulation standards. LAN Emulation permits Ethernet traffic to be transported across ATM circuits. For illustration purposes, the Ethernet and ATM ports in the network device have been separated into ingress and egress portions.

In particular, input Ethernet ports 92 are connected to an Ethernet network and adapted to receive ingress Ethernet frames. Similarly, input ATM ports 94 are connected to an ATM network and adapted to receive ingress ATM cells. Output Ethernet ports 100 are connected to the Ethernet network and adapted to output egress Ethernet frames. Similarly, output ATM ports 102 are connected to the ATM network and adapted to output egress ATM cells.

The Ethernet ports within the device may be adapted to transmit and receive either 10 Mbps, 100 Mbps or 1000 Mbps Ethernet signals. The example device is also adapted to provide Layer 2 and Layer 3 switching among the Ethernet ports. Further, the device may support VLANs, multicast and MPOA protocols. A main function of the device is to forward data frames between the two types of networks, i.e. Ethernet and ATM, via the ports connected to each type of network. The Ethernet frame received may contain various parameters that are used in the forwarding process such as, for example, MAC Destination Address (DA), MAC Source Address (SA), IP DA, VLAN ID, LEC ID, ELAN ID, LE frames (received from ATM) and MPOA frames.

The device also comprises a data processor 96 and a forwarding decision processor 98. Forwarding decisions are made by the forwarding decision processor 98 that is configured dynamically by the data processor. Ingress Ethernet frames and ATM cells are input and processed by both the data processor 96 and the forwarding decision processor. In one alternative implementation of the network device, Ethernet frames on each of the Ethernet ports are segmented into ATM cells and forwarded to the appropriate destination on either the ATM or Ethernet network. If destined to an Ethernet port, the cells are assembled back into Ethernet frames before transmission through the output port.

The ATM ports, for example, may operate at 155 Mbps (OC-3) or 622 Mbps (OC-12). The Ethernet ports may operate at 10 Mbps Ethernet, 100 Mbps Fast Ethernet or 1000 Mbps Gigabit Ethernet.

Figure 3:
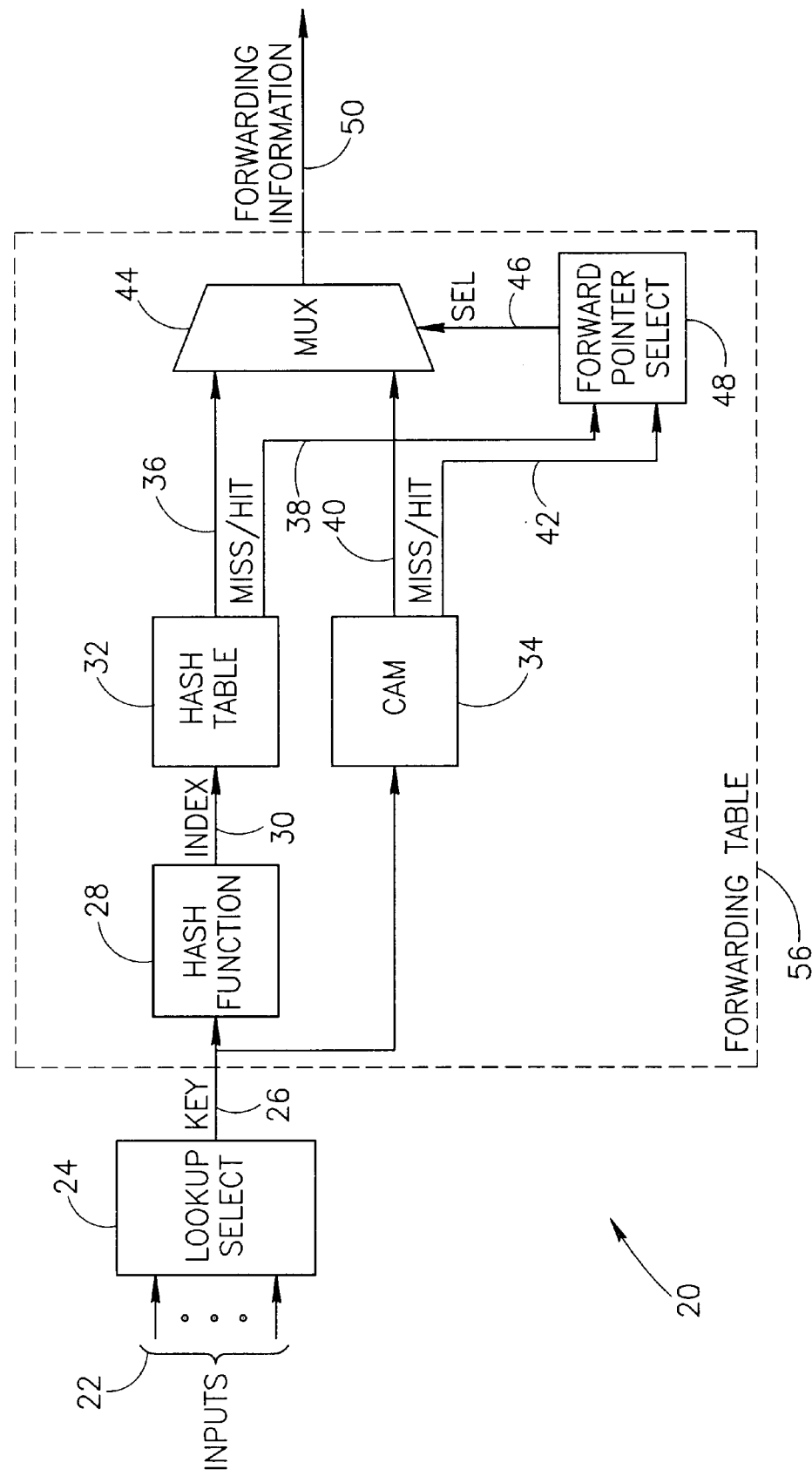
FIG. 3 is a block diagram illustrating a forwarding decision processor utilizing a combination of hash table and CAM constructed in accordance with the present invention.

A block diagram illustrating a forwarding decision processor utilizing a combination of hash table and CAM constructed in accordance with the present invention is shown in FIG. 3. The forwarding decision processor, generally referenced 20, comprises a lookup select 24 and a forwarding table 56. The forwarding table comprises a hash function 28, hash table 32, forwarding Content Addressable Memory (CAM) 34, selector (or multiplexer) 44 and forward pointer select control 48.

In the embodiment presented herein, the forwarding decision is stored in the forwarding table. A key derived from one or more inputs is used as input to the forwarding table in order to retrieve the forwarding information. The forwarding information may comprise the actual output port vector used to forward the received frame or it may comprise a compressed forwarding decision that is subsequently expanded to yield the actual output port vector.

It is important to point out that the forwarding mechanism of the invention may utilize a plurality of input parameters 22 in making a forwarding decision. Such parameters include, but are not limited, to Ethernet MAC DA, Ethernet MAC SA, IP DA, VLAN ID, LEC ID, Ethernet input port, ATM input port, ingress frame type, VP/VCI, ELAN ID) and MPOA tag. In addition, when multiple forwarding databases are used in the network device, the key may comprise additional bits indicating the forwarding database.

The one or more input parameters 22 (e.g., 48 bit MAC DA, 32 bit IP DA, etc.) are input to the lookup select circuit 24 which functions to construct a key 26 (i.e. lookup index) to the forwarding table 56. The key may comprise any number of bits suitable for performing the look up operation. For example, if the MAC DA is used, they key comprises at least 48 bits. Optionally, different types of keys may be constructed depending on the various types of forwarding supported by the network device, e.g., MAC switching, MPOA ingress, MPOA egress, etc.

The key is input to a hash function 28 and a forwarding CAM 34. The hash algorithm utilizes one or more polynomials to perform polynomial division of the key by the hash function. The results of the polynomial division include a quotient value and a remainder value, the reminder of which is used to generate the output index 30. The index 30 is used to retrieve a corresponding entry in the hash table 32.

The hash table 32 is adapted to translate the index 30 to forwarding information comprising the output port vector, or alternatively, a forwarding pointer that is later expanded into the output port vector. The hash table comprises a large enough memory to store the hashed index values in a one way set associative organization. The hashing function is operative to hash the lookup address (i.e. key) to a smaller index. The index is used to access a linear table (i.e. the hash table). The MAC address is stored at a location corresponding to the index along with the forwarding information. Alternatively, the quotient value is stored rather than the MAC address as the quotient comprises fewer bits.

The CAM 34 is used to resolve conflicts in the hash table 32. As is well known, searches in a CAM are performed based on their content such that an address (i.e. a key) to be looked up is compared against the entire contents of the CAM. A hit indicates the location in the CAM where the forwarding information is stored. A principle advantage of a CAM is that the search time is bound. The price paid for this is relatively high circuit complexity and cost. Therefore, most CAMs are typically very small in size.

In accordance with the present invention, the advantages of both a hash table and a CAM are combined in the forwarding table 56. The forwarding table combines a one way hash table 32 and a small CAM 34 to perform the forwarding information retrieval function. The data stored in the hash table is limited to one MAC address per entry thus eliminating the additional time required to search a collision linked list in the event multiple keys hash to the same entry in the hash table.

When MAC addresses are being added to the forwarding table 56, they are first tried in the hash table. In particular, the addresses are input as keys to the hash function 28 and the resulting index 30 is input to the hash table 32. A hit indicates that an entry at that index already exists (i.e. the location is occupied). A location in the CAM is then allocated for that address. As long as the CAM does not become full, a 100% hit rate is guaranteed. In other words, as long us there is available space in the CAM, it is guaranteed that 100% of the addresses can be written to either the hash table 32 or the CAM 34. In most applications, the size of the CAM required is relatively small and thus is easily incorporated in an integrated circuit such as an Application Specific Integrated Circuit (ASIC).

The forwarding information 36, 40 output of the hash table and the CAM, respectively, are input to a multiplexer whose select control signal 46 is generated by the forward pointer select control circuit 48.

In the event the requested key is not found in the hash table 32 a miss indication signal 38 is generated. Similarly, in the event the requested key is not found in the CAM 34 a miss indication signal 42 is generated. Both miss/hit indication signals 38, 42 are input to the forward pointer select control circuit 48.

In accordance with the invention, one of the two outputs from the hash table and the CAM forms the forwarding information 50 that is output to the next processing stage. The forward pointer select circuit 48 generates the select signal 46 in accordance with the miss/hit signals. Typically, either the hash table or the CAM will generate a hit and not both. Thus, if the hash table generates a hit, the multiplexer selects the forwarding information 36 generated by the hash table as the output forwarding information 50. On the other hand, if the CAM generates a hit, the multiplexer selects the forwarding information 40 generated by the CAM as the output forwarding information 50.

Hashing Functions

As described above, in the ideal case, a hash function returns a different hash value for each unique key. This means that, preferably, hash values are evenly distributed across all the hash table entries. In accordance with the present invention the following four hashing polynomials are presented that have been found by the inventors to yield relatively even distributions in network device applications where the key comprises a network address and/or a combination of related information, e.g., MAC DA, IP DA, LEC ID, VLAN ID, etc. It was found that hashing functions incorporating XORs yield better distributions. The following polynomials are a form of specialized XOR functions.

The four hashing polynomials G(x) are presented below in Equations 2, 3, 4 and 5. These functions are well suited for use in forwarding tables wherein the width of the index 30 (FIG. 3) is 16 bits.

$$G_1(x) = x^{15} + x + 1 \quad (2)$$

$$G_2(x) = x^{15} + x^8 + x^7 + x^5 + 1 \quad (3)$$

$$G_3(x) = x^{15} + x^{10} + x^9 + x^4 + 1 \quad (4)$$

$$G_4(x) = x^{15} + x^{13} + x^9 + x^8 + x^7 + x^2 + 1 \quad (5)$$

Any combination of hash functions may be used with the forwarding table of the present invention. In an alternative embodiment, the forwarding table may comprises circuitry adapted to measure the performance of a plurality of hash functions. The performance is based on the degree of distribution a particular hash function provides. Based on the measured performance, the optimum hash function may be selected.

Storing Information in the Forwarding Table

Figure 4:
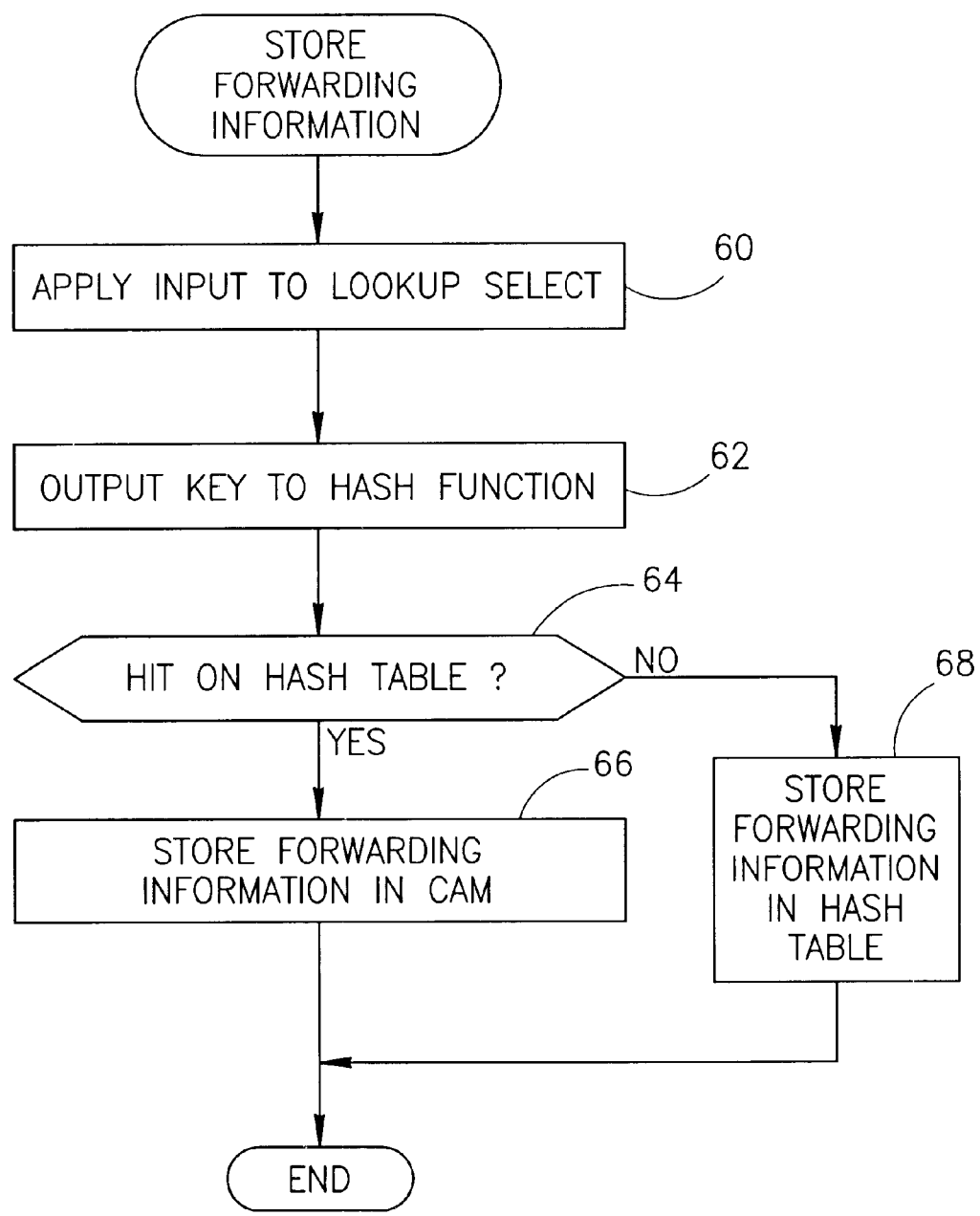
FIG. 4 is a flow diagram illustrating the method of storing forwarding information in the forwarding table comprising hash table and CAM.

A flow diagram illustrating the method of storing forwarding information in the forwarding table comprising hash table and CAM is shown in FIG. 4. Initially, the input 22 (FIG. 3) is applied to the lookup select circuit 24 (step 60). The lookup select functions to generate the key 26 from one or more input parameters. As described previously, the input parameters may be any one or a combination of MAC DA, IP DA, LEC ID, VLAN ID, etc. Once the key is obtained, it is applied to the hashing function 28 (step 62). The actual function used may comprise any of those presented above. Alternatively, the degree of distribution of the addresses over the hash table may be used as the criterion in selecting one of a plurality of hash functions.

If there is a hit on the hash table (step 64), indicating that the entry corresponding to that address is already occupied, space is allocated in the CAM and the forwarding information is stored therein (step 66). If a miss occurs on the hash table (step 64), indicating that the entry corresponding to that address is not occupied, the forwarding information is stored in the hash table (step 68).

Retrieving Information From the Forwarding Table

Figure 5:
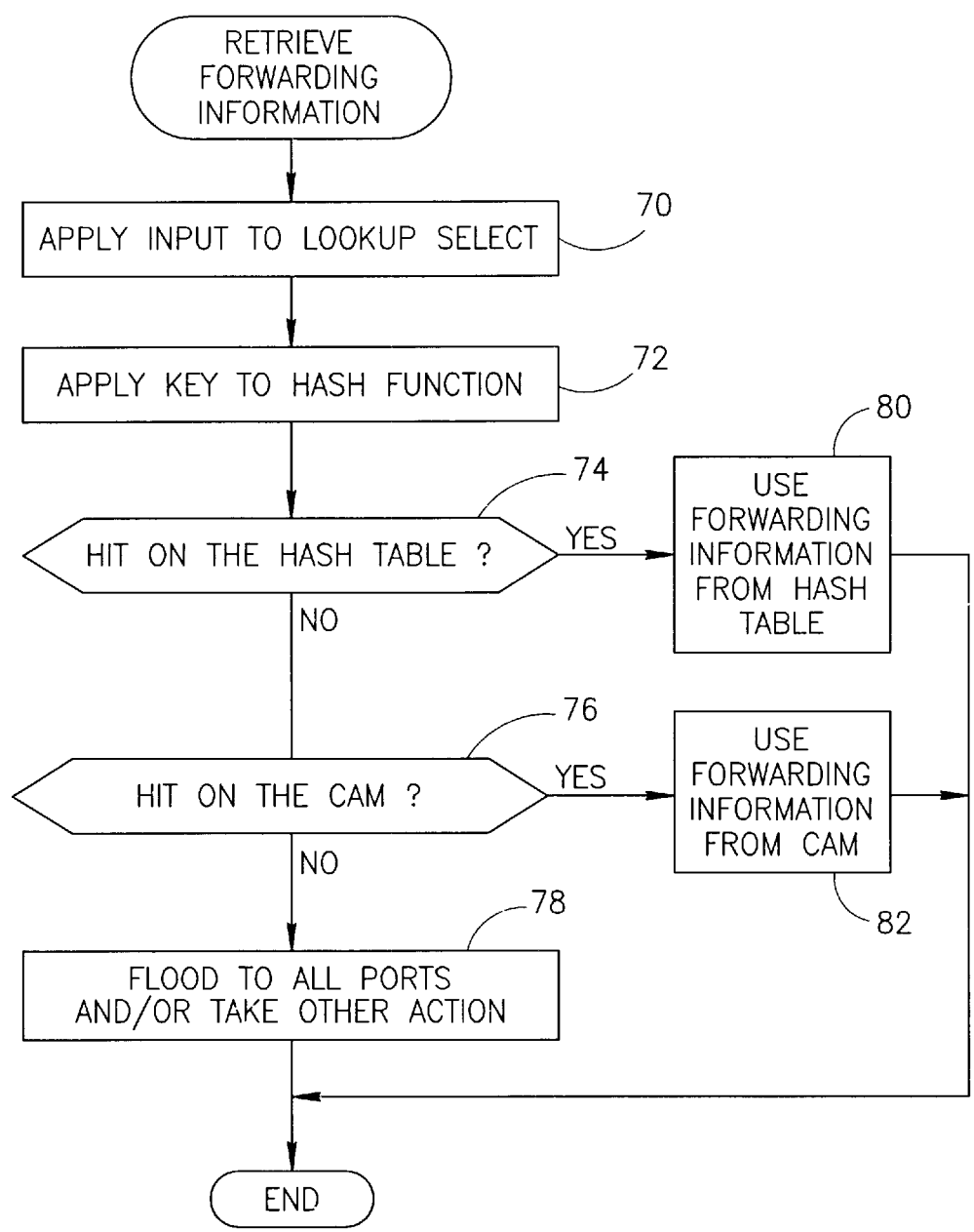
FIG. 5 is a flow diagram illustrating the method of retrieving forwarding information from the forwarding table comprising hash table and CAM.

A flow diagram illustrating the method of retrieving forwarding information from the forwarding table comprising hash table and CAM is shown in FIG. 5. First, the input, e.g.,. MAC address, is applied to the lookup select (step 70). The key generated by the lookup select is applied then hashed by one of the hashing polynomials presented above or any other suitable hash function (step 72).

If a hit occurs on the hash table (step 74), the forwarding information retrieved from the hash table is used (step 80). If a hit occurs on the CAM (step 76), the forwarding information retrieved from the CAM is used (step 82). If a miss occurs on both the hash table and the CAM, than specific action is taken (step 78). In the network device example presented herein, in the event of a miss on both the hash table and the CAM, the received frame is flooded to all the ports in the device.

Note that when searching, the hash table can be accessed in a single clock cycle with no sequential searches of a collision linked list as is the case in prior art hash tables. The majority of the addresses are found in the hash table due to the relatively large size of the hash table. The CAM may be relatively small, since most of the addresses are found in the hash table. The hash table and CAM are preferably searched in parallel. Of the two searches that are performed, the one that generates a match with the key (i.e. index MAC address) is the one whose entry is used. The use of the combination of hash table and CAM provides several benefits including (1) 100% hit ratio until the CAM fills up, at which time CAM replacements may be made, (2) the size of the hash table is large and thus it is able to hold a large address space, and (3) the forwarding table yields very high performance with one hash cycle for the parallel search of the hash table and CAM.

Note that as described above, the small size of the CAM enables its implementation in an ASIC. This permits additional functions to be provided such as (1) providing for special addresses, for example, broadcast and self MAC addresses and (2) providing for addresses the system is to treat differently such as MAC addresses that are in a status change state.

As an example, consider a forwarding table that comprises a hash table having 128K entries and a 2K CAM. Statistically, a 128K entry hash table may hold approximately 28K addresses depending on the hashing functions used and the CAM can hold 2K addresses. A 100% hit ratio is maintained assuming all addresses are stored in either the hash table or the CAM. The utilization of the hash table is approximately 22% which is reasonable considering the use of inexpensive memory devices. Note that this example forwarding table may be searched every clock cycle in accordance with the cycle time for a single memory read of the hash table or an internal CAM access.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A table for storing and retrieving a plurality of elements, comprising:
   a hash function operative to generate an index in accordance with an input key;
   a hash table having a plurality of entries and adapted to store said elements in accordance with their corresponding indexes;
   a content addressable memory (CAM) operative to store said elements in accordance with their content;
   storing means for adding an element to said hash table, said storing means operative to:
      apply said element as an input key to said hash function and to generate an index in response thereto;
      apply said index to said bash table; and in the event of a miss,
      write said element to said hash table; and in the event of a hit,
      allocate a location in said CAM and store said element therein; and
   retrieving means for retrieving an element from said hash table in accordance with an input key, said retrieving means operative to:
      apply said input key to said hash function and generate an index in response thereto;
      apply said input index to said hash table and use the element generated in the event of a hit; and
      apply said key to said CAM and use the element generated in the event of a hit.

2. The table according to claim 1, further comprising means for declaring a miss in the event both said hash table and CAM produce a miss.

3. The table according to claim 1, wherein said CAM is implemented in a monolithic integrated semiconductor circuit.

4. The table according to claim 3, wherein said integrated circuit comprises an Application Specific Integrated Circuit (ASIC).

5. The table according to claim 1, wherein each entry in said hash table is adapted to store a single element.

6. The table according to claim 1, wherein each element comprises a field for a key and a value.

7. The table according to claim 1, wherein each element comprises a field for a key comprising a Media Access Control (MAC) address and a value comprising a forwarding decision.

8. The table according to claim 1, wherein said hash function G(x) comprises the function $G(x)=x^{15}+x+1$ wherein x represents the input key to said function.

9. The table according to claim 1, wherein said hash function G(x) comprises the function $G(x)=x^{15}+x^8+x^7+x^5+1$ wherein x represent the input key to said function.

10. The table according to claim 1, wherein said hash function G(x) comprises the function $G(x)=x^{15}+x^{10}+x^9+x^1+1$ wherein x represents input key to said function.

11. The table according to claim 1, wherein said hash function G(x) comprises the function $G(x)=x^{15}+x^{13}+x^9+x^8+x^8+x^7x^2+1$ wherein x represents the input key to said function.

12. The table according to claim 1, further comprising means of selecting from a plurality of hash functions in accordance with the uniformity of distribution of indexes of each.

13. A forwarding table for storing and retrieving forwarding information based on Media Access Code (MAC) addresses, comprising:
   a hash function operative to generate an index in accordance with a MAC address input key input thereto;
   a hash table for storing said forwarding information in accordance with corresponding MAC addresses;
   a content addressable memory (CAM) operative to store said forwarding information in accordance with MAC addresses;
   storing means for adding a MAC address entry to said forwarding table, said storing means operative to:
      apply said MAC address as an input key to said hash function and to generate an index in response thereto;
      apply said index to said hash table; and in the event of a miss,
      write said forwarding information corresponding to said MAC address to said hash table; and in the event of a hit,
      allocate a location in said CAM and store said forwarding information corresponding to said MAC address therein; and
   retrieving means for retrieving said forwarding information from said forwarding table in accordance with a MAC address input key, said retrieving means operative to:
      apply said input key to said hash function and generate an index in response thereto;
      apply said index to said hash table and use the forwarding information generated in the event of a hit; and
      apply said input key to said CAM and use the forwarding information generated in the event of a hit.

14. The forwarding table according to claim 13, wherein said forwarding information comprises a plurality of output port vectors.

15. The forwarding table according to claim 13, wherein said MAC addresses comprises MAC Destination Addresses.

16. The forwarding table according to claim 13, further comprising means for declaring a miss in the event both said hash table and said CAM produce a miss.

17. The forwarding table according to claim 13, further comprising means for flooding an input frame to all output ports in the event both said hash table and said CAM produce a miss.

18. The forwarding table according to claim 13, wherein said CAM is implemented in a monolithic integrated semiconductor circuit.

19. The forwarding table according to claim 13, wherein said CAM is implemented in an Application Specific Integrated Circuit (ASIC).

20. The forwarding table according to claim 13, wherein each entry in said hash table is adapted to store a single element.

21. The forwarding table according to claim 13, wherein each entry in said hash table comprises a field for a Media Access Control (MAC) address key and forwarding information comprising an output port vector.

22. The forwarding table according to claim 13, wherein said hash function G(x) comprises the function $G(x)=x^{15}+x+1$ wherein x represents the key input to said function.

23. The forwarding table according to claim 13, wherein said hash function G(x) comprises the function $G(x)=x^{15}+x^8+x^7+x^5+1$ wherein x represents the key input to said function.

24. The forwarding table according to claim 13, wherein said hash function G(x) comprises the function $G(x)=x^{15}+x^{10}+x^9+x^4+1$ wherein x represents the key input to said function.

25. The forwarding table according to claim 13, wherein said hash function G(x) comprises the function $G(x)=x^{15}+x^{13}+x^9+x^8+x^7x^2+1$ wherein x represents the key input to said function.

26. The forwarding table according to claim 13, further comprising means of selecting from a plurality of hash functions in accordance with the uniformity of distribution of indexes of each.

27. A method of storing and retrieving forwarding information based on Media Access Code (MAC) addresses in a forwarding table, said method comprising the steps of:
   generating an index using a hashing function and in accordance with a MAC address key input thereto;
   storing said forwarding information in accordance with corresponding MAC addresses in a hash table;
   storing said forwarding information in accordance with MAC addresses in a content addressable memory (CAM);
   adding a MAC address entry to said forwarding table by:
      applying said MAC address as an input key to said hash function and generating an index in response thereto;
      applying said index to said hash table; and in the event of a miss,
      writing said forwarding information corresponding to said MAC address to said hash table; and in the event of a hit,
      allocating a location in said CAM and storing said forwarding information correspond to said MAC address therein; and
   retrieving said forwarding information from said forwarding table in accordance with a MAC address key by:
      applying said MAC address key to said hash function and generating an index in response thereto;
      applying said index to said hash table and using the forwarding information generated in the event of a hit; and
      applying said MAC address key to said CAM and using the forwarding information generated in the event of a hit.

* * * * *